United States Patent
Bae

(10) Patent No.: US 9,892,846 B2
(45) Date of Patent: Feb. 13, 2018

(54) WIRELESS POWER TRANSMITTER, WIRELESS POWER RECEIVER AND WIRELESS POWER TRANSMISSION METHOD

(75) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 978 days.

(21) Appl. No.: 14/123,470

(22) PCT Filed: Apr. 24, 2012

(86) PCT No.: PCT/KR2012/003153
§ 371 (c)(1),
(2), (4) Date: Dec. 2, 2013

(87) PCT Pub. No.: WO2012/169729
PCT Pub. Date: Dec. 13, 2012

(65) Prior Publication Data
US 2014/0103737 A1    Apr. 17, 2014

(30) Foreign Application Priority Data
Jun. 8, 2011  (KR) .......... 10-2011-0055291

(51) Int. Cl.
*H02J 5/00* (2016.01)
*H02J 7/02* (2016.01)
*H01F 38/14* (2006.01)

(52) U.S. Cl.
CPC ............. *H01F 38/14* (2013.01); *H02J 5/005* (2013.01); *H02J 7/025* (2013.01)

(58) Field of Classification Search
None
See application file for complete search history.

(56) References Cited

U.S. PATENT DOCUMENTS

2007/0153937 A1* 7/2007 Itkin .................... H03G 3/3047
375/297
2008/0157603 A1* 7/2008 Baarman ................ H02J 7/025
307/104

(Continued)

FOREIGN PATENT DOCUMENTS

JP    2006-288034 A    10/2006
JP    2010-239848 A    10/2010

(Continued)

OTHER PUBLICATIONS

International Search Report in International Application No. PCT/KR2012/003153, filed Apr. 24, 2012.

(Continued)

*Primary Examiner* — Jared Fureman
*Assistant Examiner* — James Evans
(74) *Attorney, Agent, or Firm* — Saliwanchik, Lloyd & Eisenschenk

(57) ABSTRACT

Disclosed is a wireless power transmitter. A wireless power transmitter includes a transmission coil for generating a magnetic field by receiving power from a power source, a transmission resonant coil for transmitting power to a receiving coil by using the magnetic field generated from the transmission coil by using resonance, a detection unit for detecting an approach of the receiving coil and a power regulator for adjusting an output of the power source, which supplies the power, based on the approach of the receiving coil detected by the detection unit.

14 Claims, 2 Drawing Sheets

(56) References Cited

U.S. PATENT DOCUMENTS

| | | | | |
|---|---|---|---|---|
| 2010/0084918 A1* | 4/2010 | Fells | ............... | H02J 5/005 307/32 |
| 2010/0194206 A1* | 8/2010 | Burdo | ............... | G06F 1/266 307/104 |
| 2010/0244582 A1* | 9/2010 | Yoshikawa | ............... | H02J 5/005 307/104 |
| 2012/0001485 A1* | 1/2012 | Uchida | ............... | H02J 5/005 307/11 |
| 2012/0098348 A1* | 4/2012 | Inoue | ............... | B60L 11/123 307/104 |
| 2012/0146425 A1* | 6/2012 | Lee | ............... | H02J 5/005 307/104 |
| 2013/0313893 A1* | 11/2013 | Ichikawa | ............... | H02J 17/00 307/9.1 |

FOREIGN PATENT DOCUMENTS

| | | | | |
|---|---|---|---|---|
| KR | 10-0874837 B1 | 12/2008 | | |
| WO | WO-2010/040015 A2 | 4/2010 | | |
| WO | WO2010119577 | * 10/2010 | ............... | H02J 17/00 |

OTHER PUBLICATIONS

Office Action dated Aug. 29, 2012 in Korean Application No. 10-2011-0055291, filed Jun. 8, 2011.

* cited by examiner

[Fig. 1]
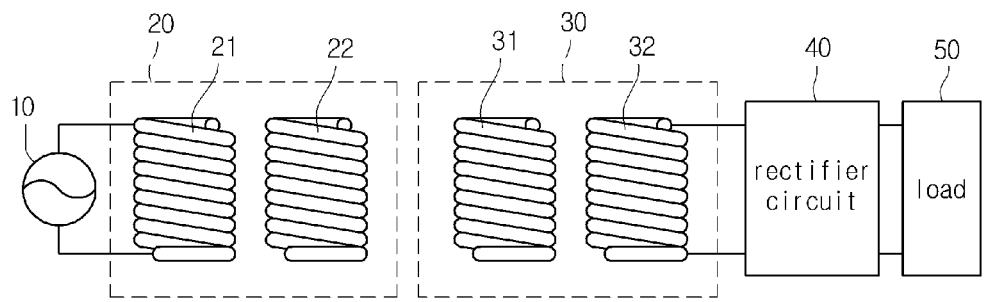
[Fig. 2]
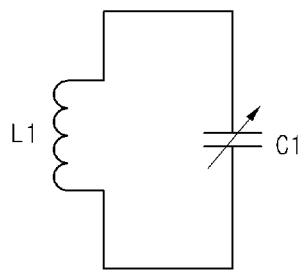
[Fig. 3]
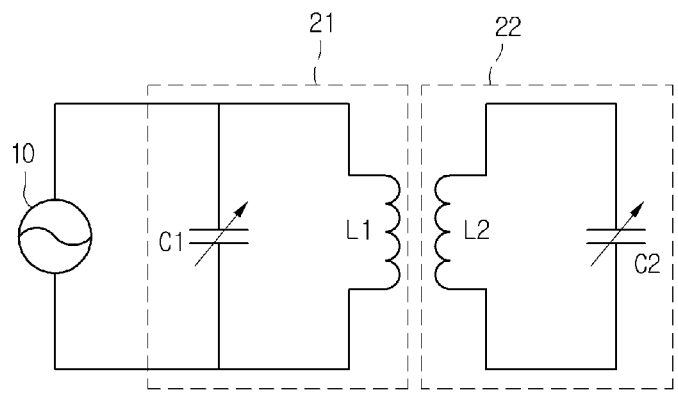
[Fig. 4]
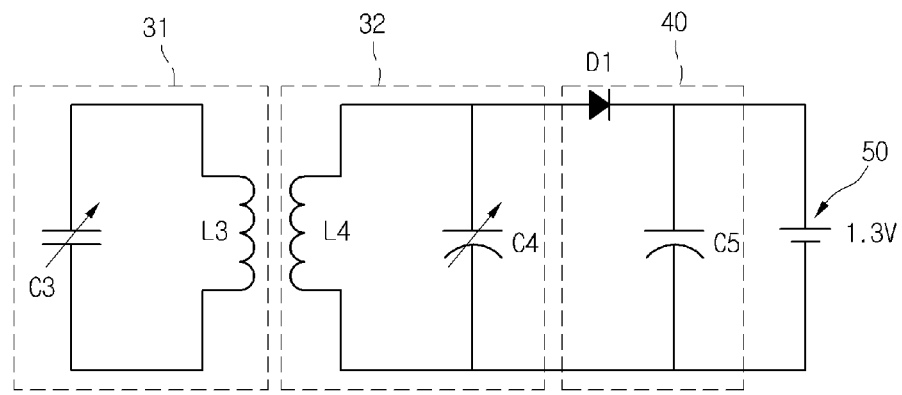

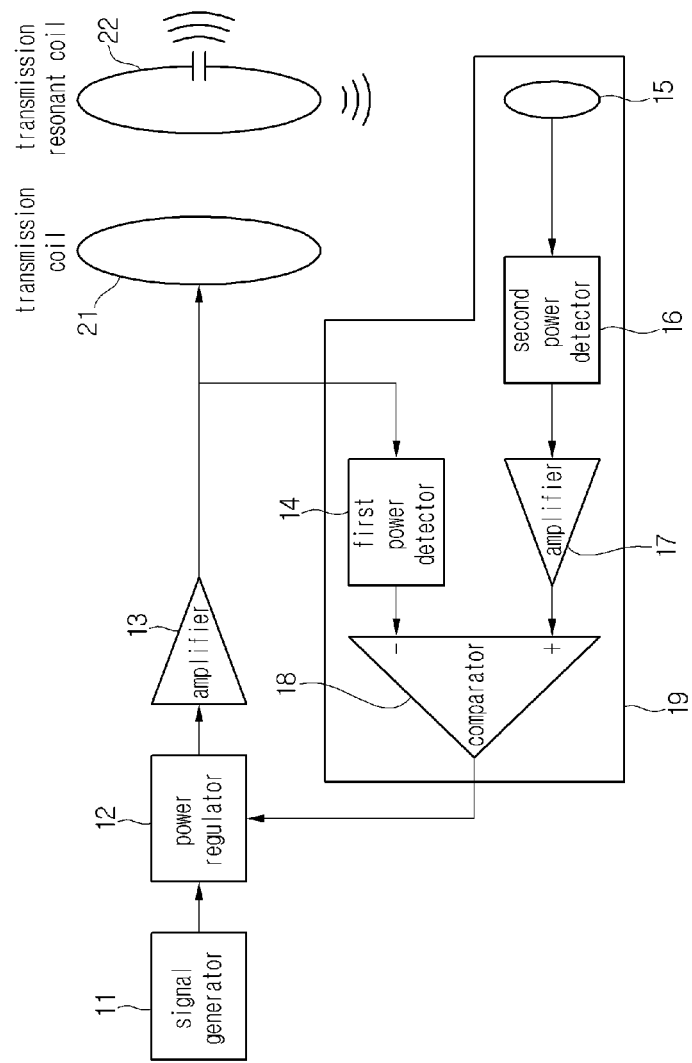

WIRELESS POWER TRANSMITTER, WIRELESS POWER RECEIVER AND WIRELESS POWER TRANSMISSION METHOD

CROSS-REFERENCE TO RELATED APPLICATIONS

This application is the U.S. national stage application of International Patent Application No. PCT/KR2012/003153, filed Apr. 24, 2012, which claims priority to Korean Application No. 10-2011-0055291, filed Jun. 8, 2011, the disclosures of each of which are incorporated herein by reference in their entirety.

TECHNICAL FIELD

The embodiment relates to a wireless power transmission. More particularly, the embodiment relates to a wireless power transmission using resonance, in which a detection coil capable of detecting energy stored in a transmission resonant coil of a wireless power transmitter is provided to detect whether a receiver is located far away. If it is determined that the receiver is located far away or does not exist, intensity of transmission power is reduced to prevent the power loss.

BACKGROUND ART

A wireless power transmission or a wireless energy transfer refers to a technology for wirelessly transferring electric energy to desired devices. In the 1800's, an electric motor or a transformer employing the principle of electromagnetic induction has been extensively used and then a method for transmitting electric energy by irradiating electromagnetic waves, such as radio waves or lasers, has been suggested. Actually, electric toothbrushes or electric razors, which are frequently used in daily life, are charged based on the principle of electromagnetic induction. Until now, the long-distance transmission using the magnetic induction, the resonance and the short-wavelength radio frequency has been used as the wireless energy transfer scheme.

In the case of a short-distance wireless power transmission, which has been spotlighted in these days, a wireless power transmitter is installed in a building in such a manner that a mobile device, such as a cellular phone or a notebook computer, can be continuously charged when a user uses the mobile device in the building even if the mobile device is not connected to an additional power cable.

However, according to the wireless power transmission of the related art, power must be constantly transmitted regardless of the existence of a receiver that receives the power, causing the waste of the power.

DISCLOSURE OF INVENTION

Technical Problem

The embodiment provides a method for preventing the waste of power by adjusting transmission power based on the existence or the location of a receiver.

Solution to Problem

A wireless power transmitter according to one embodiment includes a transmission coil for generating a magnetic field by receiving power from a power source, a transmission resonant coil for transmitting power to a receiving coil by using the magnetic field generated from the transmission coil by using resonance, a detection unit for detecting an approach of the receiving coil and a power regulator for adjusting an output of the power source, which supplies the power, based on the approach of the receiving coil detected by the detection unit.

A wireless power receiver for wirelessly receiving power from a wireless power transmitter equipped with a detection unit according to one embodiment includes a receiving resonant coil for receiving AC power from the wireless power transmitter by using resonance and a receiving coil for receiving the received AC power by using electromagnetic induction, wherein an approach of the receiving resonant coil to the wireless power transmitter is detected by the detection unit.

A wireless power transmission method according to one embodiment includes transmitting a magnetic field generated by power supplied from a power source, checking a status of the transmitted magnetic field, detecting an approach of a receiving coil that receives the magnetic field based on the status of the magnetic field and adjusting transmission power based on the approach of the receiving coil.

Advantageous Effects of Invention

According to the embodiment, the waste of power can be prevented by adjusting transmission power based on the existence or the location of a receiver.

BRIEF DESCRIPTION OF DRAWINGS

FIG. 1 is a view showing the structure of a wireless power transmission system according to one embodiment;

FIG. 2 is a view showing an equivalent circuit of a transmission coil 21 according to one embodiment;

FIG. 3 is a view showing an equivalent circuit of a power source 10 and a transmitter 20 according to one embodiment;

FIG. 4 is a view showing an equivalent circuit of a receiving resonant coil 31, a receiving coil 32, a smoothing circuit 40 and a load 50; and FIG. 5 is a view showing the structure of a wireless power transmitter according to one embodiment.

BEST MODE FOR CARRYING OUT THE INVENTION

Hereinafter, embodiments will be described in more detail with reference to accompanying drawings.

FIG. 1 is a view showing the structure of a wireless power transmission system according to one embodiment.

Power generated from a power source 10 is transmitted to a transmitter 20 and then transmitted to a receiver 30 that makes resonance with the transmitter 20 using resonance, that is, has a resonant frequency value equal to that of the transmitter 20. The power transmitted to the receiver 30 is transmitted to a load 50 through a rectifier circuit 40. The load 50 may be a battery or a device requiring the power.

In detail, the power source 10 is an AC power source to provide AC power having a predetermined frequency.

The transmitter 20 includes a transmission coil 21 and a transmission resonant coil 22. The transmission coil 21 is connected to the power source 10 and AC current is applied to the transmission coil 21. As the AC current is applied to the transmission coil 21, the AC current is induced to the transmission resonant coil 22, which is physically spaced apart from the transmission coil 21, by using the electromagnetic induction. The power transmitted to the transmission resonant coil 22 is transmitted to the power receiver 30, which forms a resonant circuit together with the power transmitter 10 using resonance.

According to the power transmission using the magnetic resonance, the power can be transmitted between two LC circuits which are impedance-matched. The power transmission using the magnetic resonance can transmit the power farther than the power transmission using the electromagnetic induction with the high power transmission efficiency.

The power receiver 30 includes a receiving resonant coil 31 and a receiving coil 32. The power transmitted through the transmission resonant coil 22 is received in the receiving resonant coil 31 so that the AC current is applied to the receiving resonant coil 31. The power transmitted to the receiving resonant coil 31 is transmitted to the receiving coil 32 by using the electromagnetic induction. The power transmitted to the receiving coil 32 is rectified through the rectifier circuit 40 and then transmitted to the load 50.

The transmitting resonant coil of the power transmitter 20 transmits power to the receiving resonant coil of the power receiver 30 by using magnetic field. The transmitting resonant coil and the receiving resonant coil are magnetically coupled and each of them can operate at resonant frequency. Resonant coupling of the transmitting resonant coil and the receiving resonant coil significantly improves power transmission efficiency between the power transmitter 20 and the power receiver 30.

FIG. 2 shows the equivalent circuit of the transmission coil 21 according to one embodiment. As shown in FIG. 2, the transmission coil 21 may include an inductor L1 and a capacitor C1 and a circuit having predetermined inductance and capacitance values can be formed by using the inductor L1 and the capacitor C1. The capacitor C1 may be a variable capacitor and the impedance matching can be performed by controlling the variable capacitor. The equivalent circuit of the transmission resonance coil 22, the receiving resonant coil 31 and the receiving coil 22 may be equal to the equivalent circuit shown in FIG. 2.

FIG. 3 is a view showing an equivalent circuit of the power source 10 and the transmitter 20 according to one embodiment. As shown in FIG. 3, the transmission coil 21 and the transmission resonant coil 22 may consist of inductors L1 and L2 having predetermined inductance values and capacitors C1 and C2 having predetermined capacitance values, respectively.

FIG. 4 is a view showing an equivalent circuit of the receiving resonant coil 31, the receiving coil 32, the smoothing circuit 40 and the load 50.

As shown in FIG. 4, the receiving resonant coil 31 and the receiving coil 32 may consist of inductors L3 and L4 having predetermined inductance values and capacitors C3 and C4 having predetermined capacitance values, respectively. The smoothing circuit 40 may consist of a diode D1 and a smoothing capacitor C5 and can output DC power by converting AC power to the DC power. Although the load 50 is shown as a DC power source of 1.3V, the load 50 may be a battery or a device requiring the DC power.

Meanwhile, according to the embodiment, a detection unit for detecting the location of the receiver is installed at a side of the wireless power transmitter to adjust intensity of the transmission power according to the location of the receiver.

FIG. 5 is a view showing the structure of the wireless power transmitter according to one embodiment.

In FIG. 5, elements except for the transmission coil 21 and the transmission resonant coil 22 may be included in the power source 10 shown in FIG. 1.

As shown in FIG. 5, the wireless power transmitter according to one embodiment includes a signal generator 11, a transmission coil 21 connected to the signal generator 1 to form a magnetic field, a transmission resonant coil 22 coupled with the transmission coil 21 to transmit the power, a detection unit 19 for detecting the location of a coil of a receiving side, and a power regulator 12 for controlling the output of the power source based on the location of the coil of the receiving side.

In addition, the wireless power transmitter according to one embodiment may further include an amplifier 13 which transmits the output of the signal generator 11 by amplifying the output of the signal generator 11.

The detection unit 19 includes a first power detector 14 that detects an output of the signal generator 11 to convert the output into DC current, a detection coil 15 for detecting intensity of a magnetic field transmitted from the transmission resonant coil 22, a second power detector 16 that converts the power, which is generated by the magnetic field detected from the detection coil 15, into DC current, and a comparator that compares the output of the first power detector 14 with the output of the second power detector 16 and transmits the comparison result to the power regulator 12.

In addition, the detection unit 19 may further include an amplifier 17 for amplifying the DC current converted by the second power detector 16.

The detection unit 19 measures the intensity of the magnetic field generated by the transmission coil. If the intensity of the magnetic field exceeds a reference value, the power regulator 12 determines that the coil of the receiving side may not approach the transmitter, so the power regulator 12 reduces the transmission power.

When the receiver rarely receives the power because the receiver is located far away from the transmitter or when it is not necessary for the transmitter to generate the power because there is no receiver, the wireless power transmitter according to the embodiment automatically shuts off the power transmission by detecting the above situation.

When the wireless power transmitter is installed in the room and a wireless power receiver is installed in a cellular phone or a notebook computer, if the cellular phone or the notebook computer does not exist in the room or is located far away from the wireless power transmitter, the transmission power of the wireless power transmitter is automatically reduced to prevent the power loss.

The principle of the wireless power transmitter according to the embodiment is as follows. Referring to FIG. 5, the transmission resonant coil 22 stores power using resonance. The amount of energy stored in the transmission resonant coil 22 can be expressed as: input power×Q (quality factor)×$2\pi \times f_r$, where $f_r$ is the resonant frequency. The Q value of the transmission resonant coil 22 may become lowered as the power received in the receiver is increased because the receiver approaches the transmitter.

In addition, since the amount of the magnetic field generated from the transmission resonant coil 22 is proportional to the energy stored in the transmission resonant coil 22, the amount of the energy stored in the transmission resonant coil 22 may be reduced as the receiver approaches the transmitter, so the intensity of the magnetic field generated from the transmission resonant coil 22 is weakened. Thus, the amount of power detected by the detection coil 15 is also reduced.

The detection coil 15 is coupled with the magnetic field generated from the transmission resonant coil 22 and the second power detector 16 converts the coupled magnetic field into a DC voltage signal. Since the DC voltage signal converted by the second power detector 16 is very low, the amplifier 17 amplifies the DC voltage signal.

The first power detector 14 may output a constant DC voltage.

Since the DC voltage output from the first power detector 14 is constant, the DC voltage can be used as a reference value. If the DC voltage output from the amplifier 17 or the second power detector 16 is constant, the output of the comparator 18 may have the constant value of high or low.

If the receiver moves far from the transmitter, the amount of the energy stored in the transmission resonant coil 22 is increased and the intensity of the magnetic field generated from the transmission resonant coil 22 is increased. That is, if the output of the comparator becomes high (or low) because the DC voltage output from the amplifier 17 exceeds a predetermined voltage level, the power regulator 12 outputs a power reduction signal based on the output of the comparator. The power reduction signal refers to a signal for reducing the transmission power and the power regulator 12 can reduce the power transmitted from the transmission coil 21 and the transmission resonant coil 22 or can make the power as zero by using the power reduction signal.

In contrast, if the output of the comparator becomes low (or high) because the DC voltage output from the amplifier 17 is less than the predetermined voltage level, the power regulator 12 outputs a power increase signal based on the output of the comparator. The power regulator 12 can increase the power transmitted from the transmission coil 21 and the transmission resonant coil 22 by using the power increase signal.

In other words, the output of the first power detector 14 is always kept in a constant level, so the output value of the first power detector 14 can be used as the reference value for detecting the approach of the receiving coil.

In addition, the output of the second power detector 16 may vary depending on the location of the coil of the receiving side. Preferably, the output of the second power detector 16 becomes reduced as the coil of the receiving side approaches the transmitter or becomes increased as the coil of the receiving side moves far away from the transmitter.

The comparator 18 compares the output value of the first power detector 14 with the output value of the second power detector 16 and outputs the high or low signal according to the comparison result. Preferably, the comparator 18 outputs the low (or high) signal when the output value of the first power detector 14 is equal to or higher than the output value of the second power detector 16. At this time, if the output value of the second power detector 16 becomes higher than the output value of the first power detector 14 because the coil of the receiving side moves far away from the transmitter, the comparator 18 outputs the high (or low) signal. That is, the high (or low) signal output from the comparator 18 signifies that the coil of the receiving side moves far away from the transmitter.

Upon receiving the high (or low) signal from the comparator 18, the power regulator 12 reduces the power transmitted from the transmission resonant coil 22 or makes the power as zero, thereby minimizing the power loss.

Therefore, the power loss can be reduced when there is no receiver or the receiver is located far away from the transmitter.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A wireless power transmitter comprising:
a first coil;
a second coil coupled to the first coil to transmit power by using resonance;
a detection unit for detecting a state of a receiving side; and
a power regulator for adjusting the transmit power according to the detection result of the detection unit,
wherein the detection unit comprises:
a first power detector for detecting a first power of a power source and outputting a first signal;
a second power detector for detecting a second power of the second coil and outputting a second signal;
a third coil coupled to the second coil to detect an intensity of a magnetic field of the second coil, wherein the intensity of the magnetic field of the second coil is converted into the second signal by the second power detector; and
a comparator for outputting a control signal according to the comparing result of the first signal with the second signal;
wherein the first power detector detects the first power of the power source before the first power is transmitted to the first coil.

2. The wireless power transmitter of claim 1, wherein the state of the receiving side is a location of the receiving side.

3. The wireless power transmitter of claim 2, wherein the detection unit detects the location of the receiving side based on an intensity of a magnetic field of the second coil.

4. The wireless power transmitter of claim 1, wherein the first power is used as a reference value.

5. The wireless power transmitter of claim 1, wherein if the second signal is higher than the first signal such that the receiving side moves far away from the transmitter, the power regulator reduces a power or makes a power as zero.

6. The wireless power transmitter of claim 1, wherein if the second signal is lower than the first signal such that the receiving side is accessible to the transmitter, the power regulator increases a power.

7. A wireless power transmitter which wirelessly transmits power to a wireless power receiver, the wireless power transmitter comprising:
a power source for generating an AC electrical current;
a power transmission coil for converting the AC electrical current to a magnetic field and transmitting the power to the wireless power receiver;
a detection unit for detecting an environmental condition of the power transmission coil; and
an impedance matching circuit comprising a capacitor,
wherein the wireless power transmitter controls the power according to the environmental condition of the power transmission coil detected by the detection unit;
wherein the detection unit compares a first voltage signal based on the AC electrical current with a second voltage signal based on the environmental condition, wherein the wireless power transmitter is configured to reduce or terminate transmission of the power if a result of the comparison performed by the detection unit is below a predetermined value, and wherein the first voltage signal compared by the detection unit is a signal prior to any impedance matching by the impedance matching circuit.

8. The wireless power transmitter of claim 7, wherein if the result of the comparison is below the predetermined value, the detection unit sends a signal to the power transmission coil causing the power transmission coil to reduce or terminate power transfer to the wireless power receiver.

9. The wireless power transmitter of claim 7, wherein the environmental condition comprises a position of an object in relation to the wireless power transmitter.

10. The wireless power transmitter of claim 9, wherein the wireless power transmitter is configured to automatically reduce the power transmitted, based on the environmental condition, to inhibit power loss.

11. A wireless power transmission method comprising:
generating an AC electrical current from a power source;
converting, by a power transmission coil of a wireless power transmitter, the AC electrical current to a magnetic field;
transmitting, by the power transmission coil, the power to a wireless power receiver;
determining, by a detection unit, an environmental condition of the power transmission coil; and
comparing, by the detection unit, a first voltage signal based on the AC electrical current with a second voltage signal based on the environmental condition;
wherein the wireless power transmitter is configured to reduce or terminate transmission of the power if a result of the comparison performed by the detection unit is below a predetermined value, and
wherein the first voltage signal compared by the detection unit is a signal prior to any impedance matching.

12. The wireless power transmission method of claim 11, wherein if the result of the comparison is below the predetermined value, the detection unit sends a signal to the power transmission coil causing the power transmission coil to reduce or terminate power transfer to the wireless power receiver.

13. The wireless power transmission method of claim 11, wherein the environmental condition comprises a position of an object in relation to the wireless power transmitter.

14. The wireless power transmission method of claim 13, wherein the wireless power transmitter is configured to automatically reduce the power transmitted, based on the environmental condition, to inhibit power loss.

* * * * *